(12) United States Patent
Iida et al.

(10) Patent No.: US 10,792,888 B2
(45) Date of Patent: Oct. 6, 2020

(54) COATING BASE MATERIAL

(71) Applicant: NIPPON PILLAR PACKING CO., LTD., Osaka (JP)

(72) Inventors: Toshihide Iida, Osaka (JP); Noboru Tamaki, Osaka (JP); Masateru Yamada, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 0 days.

(21) Appl. No.: 16/499,008

(22) PCT Filed: Jan. 22, 2018

(86) PCT No.: PCT/JP2018/001824
§ 371 (c)(1),
(2) Date: Sep. 27, 2019

(87) PCT Pub. No.: WO2018/179718
PCT Pub. Date: Oct. 4, 2018

(65) Prior Publication Data
US 2020/0047452 A1   Feb. 13, 2020

(30) Foreign Application Priority Data

Mar. 29, 2017   (JP) ................. 2017-065764

(51) Int. Cl.
*B32B 3/30*      (2006.01)
*B23K 26/354*    (2014.01)
*B23K 26/364*    (2014.01)

(52) U.S. Cl.
CPC ............ *B32B 3/30* (2013.01); *B23K 26/354* (2015.10); *B23K 26/364* (2015.10);
(Continued)

(58) Field of Classification Search
CPC . B32B 3/30; B23K 26/364; Y10T 428/24355; Y10T 428/24479; Y10T 428/24612
See application file for complete search history.

(56) References Cited

U.S. PATENT DOCUMENTS 9,649,721 B2      5/2017  Sato
2013/0182328 A1*  7/2013  Stewart ................. G02B 1/118
                                                            359/580

FOREIGN PATENT DOCUMENTS

JP    11163261 A      6/1999
JP    2000158157 A    6/2000
(Continued)

OTHER PUBLICATIONS

International Search report WO2018JP01824 dated Mar. 6, 2018 )(pp. 1-3).

*Primary Examiner* — Donald J Loney
(74) *Attorney, Agent, or Firm* — Millen, White, Zelano & Branigan, P.C.; William Nixon (57) ABSTRACT

Provided is a coating base material having a new configuration capable of enhancing the durability of a coating regardless of the adhesion strength of a primer. A coating base material 1 whose surface is subjected to application of a coating includes: a mesh-like valley portion 2 formed on the surface; and a plurality of island portions 3 formed on the surface and surrounded by the valley portion 2. Each island portion 3 has a crater-like recess 4 formed on an upper surface thereof.

5 Claims, 10 Drawing Sheets

(52) U.S. Cl.
CPC .................. *Y10T 428/24355* (2015.01); *Y10T 428/24479* (2015.01); *Y10T 428/24612* (2015.01)

(56) References Cited

FOREIGN PATENT DOCUMENTS

| | | |
|---|---|---|
| JP | 2016010811 A | 1/2016 |
| JP | 2016172273 A | 9/2016 |

\* cited by examiner

PEEL TEST RESULTS

ADHESION STRENGTH UNIT: kgf/cm

| NUMBER OF TIMES OF TEST | BASE MATERIAL A | | BASE MATERIAL B | | BASE MATERIAL C | |
|---|---|---|---|---|---|---|
| | ADHESION STRENGTH | STATE | ADHESION STRENGTH | STATE | ADHESION STRENGTH | STATE |
| FIRST TIME | 4.77 | DELAMINATION | 5.13 | DELAMINATION | 6.10 | COATING FILM BREAK |
| SECOND TIME | 4.82 | DELAMINATION | 4.90 | DELAMINATION | 6.11 | COATING FILM BREAK |
| THIRD TIME | 4.68 | DELAMINATION | 4.88 | DELAMINATION | 6.05 | COATING FILM BREAK |
| FOURTH TIME | 4.87 | DELAMINATION | 4.90 | DELAMINATION | 6.10 | COATING FILM BREAK |
| FIFTH TIME | 4.82 | DELAMINATION | 4.63 | DELAMINATION | 6.43 | COATING FILM BREAK |
| AVERAGE | 4.8 | | 4.9 | | 6.2 | |

| NUMBER OF TIMES OF TEST | BASE MATERIAL D | | BASE MATERIAL E | |
|---|---|---|---|---|
| | ADHESION STRENGTH | STATE | ADHESION STRENGTH | STATE |
| FIRST TIME | 6.43 | COATING FILM BREAK | 6.94 | COATING FILM BREAK |
| SECOND TIME | 6.79 | COATING FILM BREAK | 6.83 | COATING FILM BREAK |
| THIRD TIME | 6.52 | COATING FILM BREAK | 7.05 | COATING FILM BREAK |
| FOURTH TIME | 6.47 | COATING FILM BREAK | 7.07 | COATING FILM BREAK |
| FIFTH TIME | 6.89 | COATING FILM BREAK | 6.68 | COATING FILM BREAK |
| AVERAGE | 6.6 | | 6.9 | |

COATING BASE MATERIAL

TECHNICAL FIELD

The present invention relates to a coating base material.

BACKGROUND ART

As a technique to enhance the durability of a coating applied to the surface of a base material, there is known a method in which a fine uneven shape is formed on the surface of a base material by blasting or laser machining, and a coating material that has entered the recessed portions of the fine uneven shape closely adheres to the projection portions of the fine uneven shape so as to hold the peripheries of the projection portions by shrinkage stress generated when the coating material cures, thereby enhancing the adhesion strength between the surface of the base material and the coating material (see, for example, FIG. 1 of PATENT LITERATURE 1).

CITATION LIST

Patent Literature

PATENT LITERATURE 1: Japanese Laid-Open Patent Publication No. 2000-158157

SUMMARY OF INVENTION

Technical Problem

Furthermore, using a chromic acid-based primer (undercoating) in addition to the above uneven shape in order to enhance the durability of the coating is considered. However, the chromic acid-based primer contains hexavalent chromium, which has a high load on the environment, and also has a risk that this hexavalent chromium will be eluted. Therefore, use of a primer (for example, a primer of a polymer component) other than the chromic acid-based primer has been proposed. However, in this case, as compared to the chromic acid-based primer, the adhesion strength is inferior, and blisters occur in long-term use, so that there is a problem in durability.

The present invention has been made in view of the above circumstances, and an object of the present invention is to provide a coating base material having a new configuration capable of enhancing the durability of a coating regardless of the adhesion strength of a primer.

Solution to Problem

A coating base material of the present invention is a coating base material whose surface is subjected to application of a coating, the coating base material including: a mesh-like valley portion formed on the surface; and a plurality of island portions formed on the surface and surrounded by the valley portion, wherein each island portion has a crater-like recess formed on an upper surface thereof.

According to the present invention, since an uneven shape is also formed on the upper surface of each island portion by a crater-like recess in addition to the uneven shape composed of the mesh-like valley portion and the plurality of island portions on the surface of the coating base material, when a coating is applied to the surface of the coating base material, a coating material located at the inner side (recess side) and the outer side of a bank portion, which bulges on the peripheral edge of each recess, closely adheres to the bank portion so as to hold the inner side and the outer side of the bank portion by shrinkage stress generated when the coating material cures. Accordingly, the adhesion strength between the surface of the coating base material and the coating material can be further enhanced, and thus the durability of the coating can be enhanced regardless of the adhesion strength of a primer.

In the coating base material, the recess preferably has a depth not less than $1/5$ of a depth of the valley portion. In this case, the coating material can be appropriately closely adhered to the bank portion on the peripheral edge of the recess, and thus the durability of the coating can be further enhanced.

In the coating base material, preferably, the valley portion and the island portions are formed by irradiation of the surface with a laser beam, and the recess is formed by a portion, melted from the surface by the irradiation with the laser beam, bulging on a peripheral edge of the upper surface. In this case, since each recess can be simultaneously formed when the valley portion and the island portions are formed by the irradiation with the laser beam, the coating base material can be efficiently produced.

In the coating base material, the recess preferably has a depth not less than $1/5$ and not greater than $3/5$ of a depth of the valley portion. In this case, the coating material can be appropriately closely adhered to the bank portion on the peripheral edge of the recess, and occurrence of blisters in the coating film can be inhibited. Therefore, the durability of the coating can be further enhanced.

Advantageous Effects of Invention

With the coating base material of the present invention, the durability of a coating can be enhanced regardless of the adhesion strength of a primer.

DESCRIPTION OF EMBODIMENTS

Next, preferred embodiments of the present invention will be described with reference to the accompanying drawings.

Figure 1:
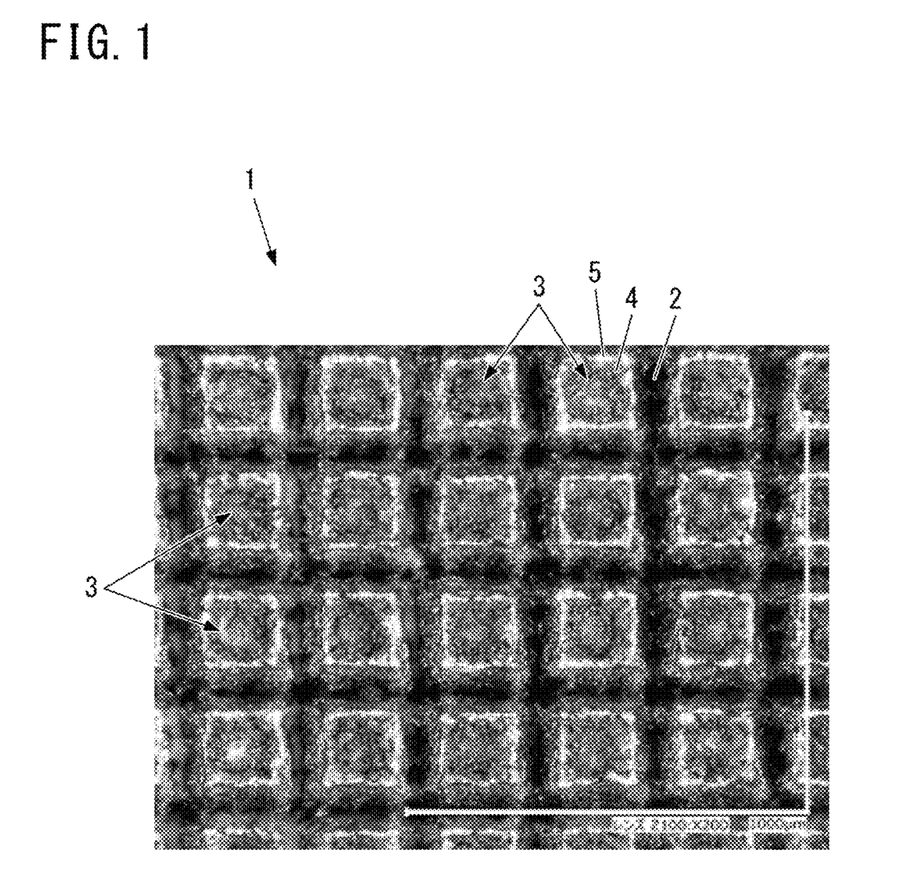
FIG. 1 is a drawing-substituting photograph showing a micrograph obtained by photographing the surface of a coating base material according to an embodiment of the present invention from the front.
Figure 2:
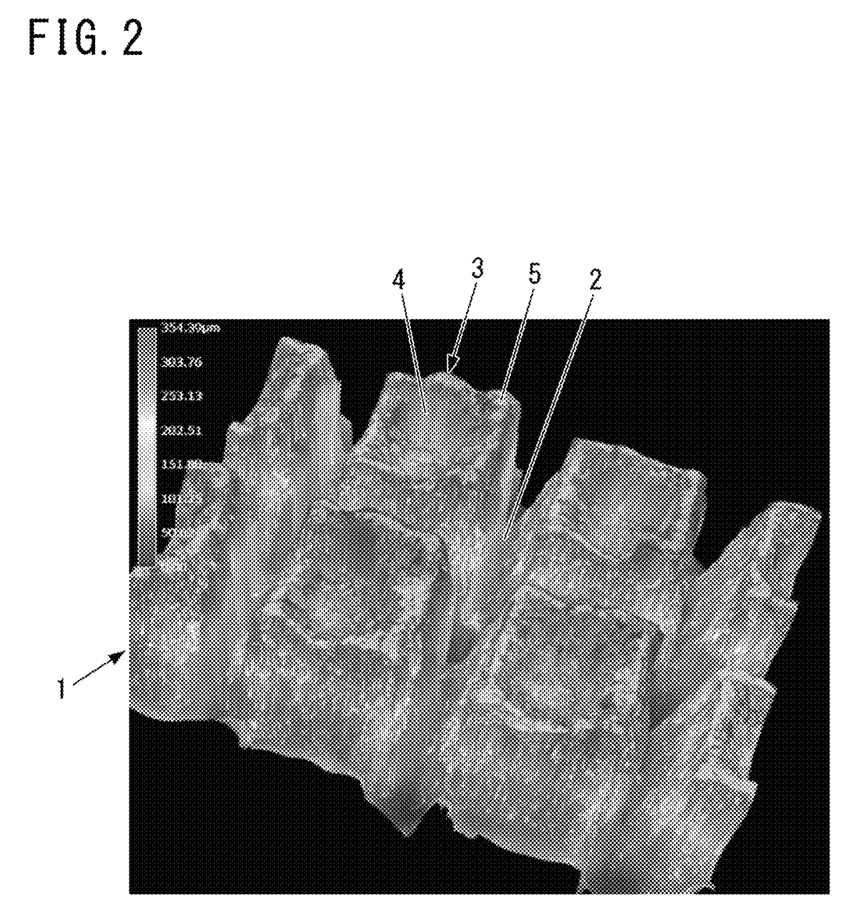
FIG. 2 is a drawing-substituting photograph showing the three-dimensional shape of the surface of the coating base material.

FIG. 1 is a drawing-substituting photograph showing a micrograph obtained by photographing the surface of a coating base material according to an embodiment of the present invention from the front. FIG. 2 is a drawing-substituting photograph showing the three-dimensional shape of the surface of the coating base material. A coating is applied to the surface of the coating base material.

The coating base material of the present embodiment is used as a member for a pump installed in a semiconductor or liquid crystal manufacturing apparatus, and a chemical-resistant fluorine coating is applied to the surface of the coating base material with which a chemical solution within the pump directly contacts. It should be noted that a coating other than the fluorine coating may be applied to the surface of the coating base material.

In FIG. 1 and FIG. 2, a coating base material 1 (hereinafter, also simply referred to as "base material 1") is formed, for example, from a metallic member, and a fine uneven shape is formed on the entire surface of the base material 1 by laser machining Specifically, a fine mesh-like valley portion 2 (a portion shown in black in FIG. 1) is formed on the surface of the base material 1 as a result of the surface being partially melted by irradiating the surface with a laser beam, and a plurality of fine island portions 3 surrounded by the valley portion 2 are also formed on the surface of the base material 1.

The plurality of island portions 3 are portions left on the surface of the base material 1 without being irradiated with the laser beam. The island portions 3 of the present embodiment are each formed, for example, in a square shape in a front view. A crater-like recess 4 is formed on the entire upper surface of each island portion 3. The recess 4 of the present embodiment is formed by a portion, melted from the surface of the base material 1 by the above irradiation with the laser beam, bulging on the peripheral edge of the upper surface of the island portion 3. Therefore, a bank portion 5 having an outer shape formed substantially in a square shape in a front view is formed on the entire peripheral edge of the recess 4 by the portion melted from the surface of the base material 1.

Figure 3:
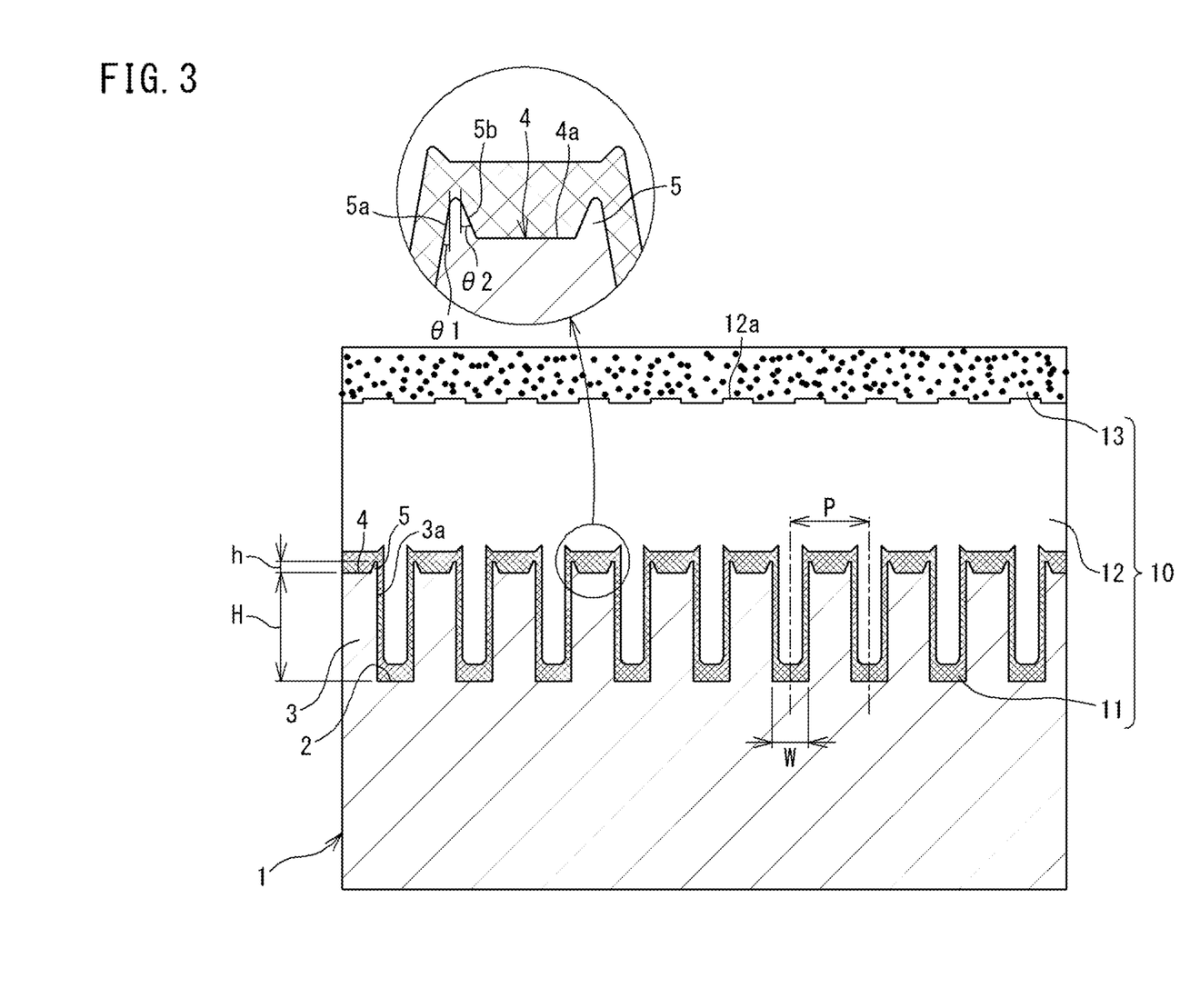
FIG. 3 is an enlarged cross-sectional view showing a state where a coating is applied to the surface of the coating base material.

FIG. 3 is an enlarged cross-sectional view showing a state where a coating is applied to the surface of the base material 1. As shown in this drawing, an outer surface 5a of the bank portion 5 is formed as an inclined surface that is inclined relative to the vertical direction at an angle θ1. Similarly, an inner surface 5b of the bank portion 5 is formed as an inclined surface that is inclined relative to the vertical direction at an angle θ2. The outer surface 5a and the inner surface 5b of the bank portion 5 are formed such that a relationship of θ2≠θ1 and a relationship of θ2>θ1 or θ2<θ1 are satisfied. The outer surface 5a and the inner surface 5b of the bank portion 5 in the present embodiment are formed such that the relationship of θ2>θ1 is satisfied.

The depth h (see FIG. 3) of the recess 4 is not particularly limited in the present invention, but is preferably not less than 20 μm and not greater than 500 μm. From the standpoint of inhibiting occurrence of blisters in a coating applied to the surface of the base material 1, the depth h is desirably not less than 20 μm. In addition, from the standpoint of facilitating penetration of a coating material into the recess 4 and from the standpoint of efficiently forming the recess 4, the depth h is desirably not greater than 500 μm.

The depth H (see FIG. 3) of the valley portion 2 is also not particularly limited in the present invention, but is preferably not less than 100 μm and not greater than 500 μm. From the standpoint of inhibiting occurrence of blisters in a coating applied to the surface of the base material 1, the depth H is desirably not less than 100 μm. In addition, from the standpoint of facilitating penetration of a coating material into the valley portion 2 and from the standpoint of efficiently forming the valley portion 2, the depth H is desirably not greater than 500 μm.

Here, preferably, the depth h of the recess 4 is set to be not less than ⅕ of the depth H of the valley portion 2 such that the difference between the depth h and the depth H is made smaller. The depth h of the recess 4 is more preferably set to a value closer to the depth H of the valley portion 2. In addition, in the case where the recess 4 is formed by irradiation with a laser beam as in the present embodiment, the depth h of the recess 4 is preferably set so as to be not less than ⅕ and not greater than ⅗ of the depth H of the valley portion 2.

The width W (see FIG. 3) of the valley portion 2 is not particularly limited in the present invention, but is preferably not less than 20 μm and not greater than 300 μm. From the standpoint of preventing occurrence of blisters by sufficiently filling the valley portion 2 with a coating material without occurrence of any voids, the width W is desirably not less than 20 μm. In addition, from the standpoint of performing machining with a laser, the width W is desirably not greater than 300 μm. In the present embodiment, the width W of the valley portion 2 is set, for example, to 93 μm.

The pitch P (see FIG. 3) of the valley portion 2 is not particularly limited in the present invention, but is preferably not less than 100 μm and not greater than 500 μm. From the standpoint of setting the recess 4 at a predetermined depth h, the pitch P is desirably not less than 100 μm. In addition, from the standpoint of inhibiting occurrence of blisters in a coating applied to the surface of the base material 1, the pitch P is desirably not greater than 500 μm. In the present embodiment, the pitch P of the valley portion 2 is set, for example, to 304 μm.

Moreover, the surface roughness of a side surface 3a of each island portion 3 formed by laser machining is set so as to be higher than the surface roughness of the valley portion 2 (bottom surface) or the surface roughness of a bottom surface 4a of the recess 4. As described above, in the present embodiment, the surface roughness of each of the side surfaces 3a of the island portions 3 having a very large area among the valley portion 2 and the island portions 3 is set so as to be higher than the surface roughness of the valley portion 2 having a small area or the surface roughness of the bottom surface 4a of the recess 4. Thus, the adhesion between the side surface 3a and a coating material is enhanced, so that the durability of a coating film 10 can be enhanced.

The coating film 10 applied to the surface of the base material 1 is formed by laminating a primer layer 11, an intermediate layer 12, and a top layer 13 in this order on the surface of the base material 1. For the primer layer 11, for example, a primer of a polymer component is used as a coating material, and the primer layer 11 is thinly formed on the surface of the base material 1 such that the uneven shape such as the valley portion 2, the island portions 3, and the recesses 4 is left on the surface of the base material 1. For the primer layer 11, a primer other than the polymer component may be used as long as the primer has a low load on the environment.

For the intermediate layer 12, a fluorine resin containing a filler is used as a coating material, and the intermediate layer 12 is formed on the upper side of the primer layer 11. A fine uneven shape 12a different from the uneven shape on the surface of the base material 1 is formed on the upper surface of the intermediate layer 12. For the intermediate layer 12, a step of application and baking may be repeated a plurality of times. In this case, intermediate layers 12 are laminated on each other.

For the top layer 13, a high-purity fluorine resin is used as a coating material, and the top layer 13 is formed on the upper side of the intermediate layer 12.

Next, a peel test and a corrosion resistance test that were carried out by the present inventors to verify the effects obtained by the coating base material 1 of the present embodiment, will be described.

In the peel test, for each of five types of base materials A to E described below, a test, in which a coating containing a primer of a polymer component is applied to each of the surfaces of the base materials A to E, then the coating film is peeled off by a general-purpose tensile testing machine, and adhesion strength (peel strength) that is a peeling load for peeling the coating film is measured, was carried out five times, and the average of the adhesion strength was calculated.

Base material A: a base material whose surface had been untreated.

Base material B: a base material whose surface had been subjected to conventional blasting.

Base material C: a base material whose surface had been subjected to the laser machining of the present embodiment and in which the valley portion width W=100 μm, valley portion pitch P=900 μm, valley portion depth H=160 μm, and recess depth h=50 μm (=0.31H).

Base material D: a base material whose surface had been subjected to the laser machining of the present embodiment and in which the valley portion width W=100 μm, valley portion pitch P=600 μm, valley portion depth H=160 μm, and recess depth h=50 μm (=0.31H).

Base material E: a base material whose surface had been subjected to the laser machining of the present embodiment and in which the valley portion width W=100 μm, valley portion pitch P=300 μm, valley portion depth H=160 μm, and recess depth h=50 μm (=0.31H).

Figure 4:
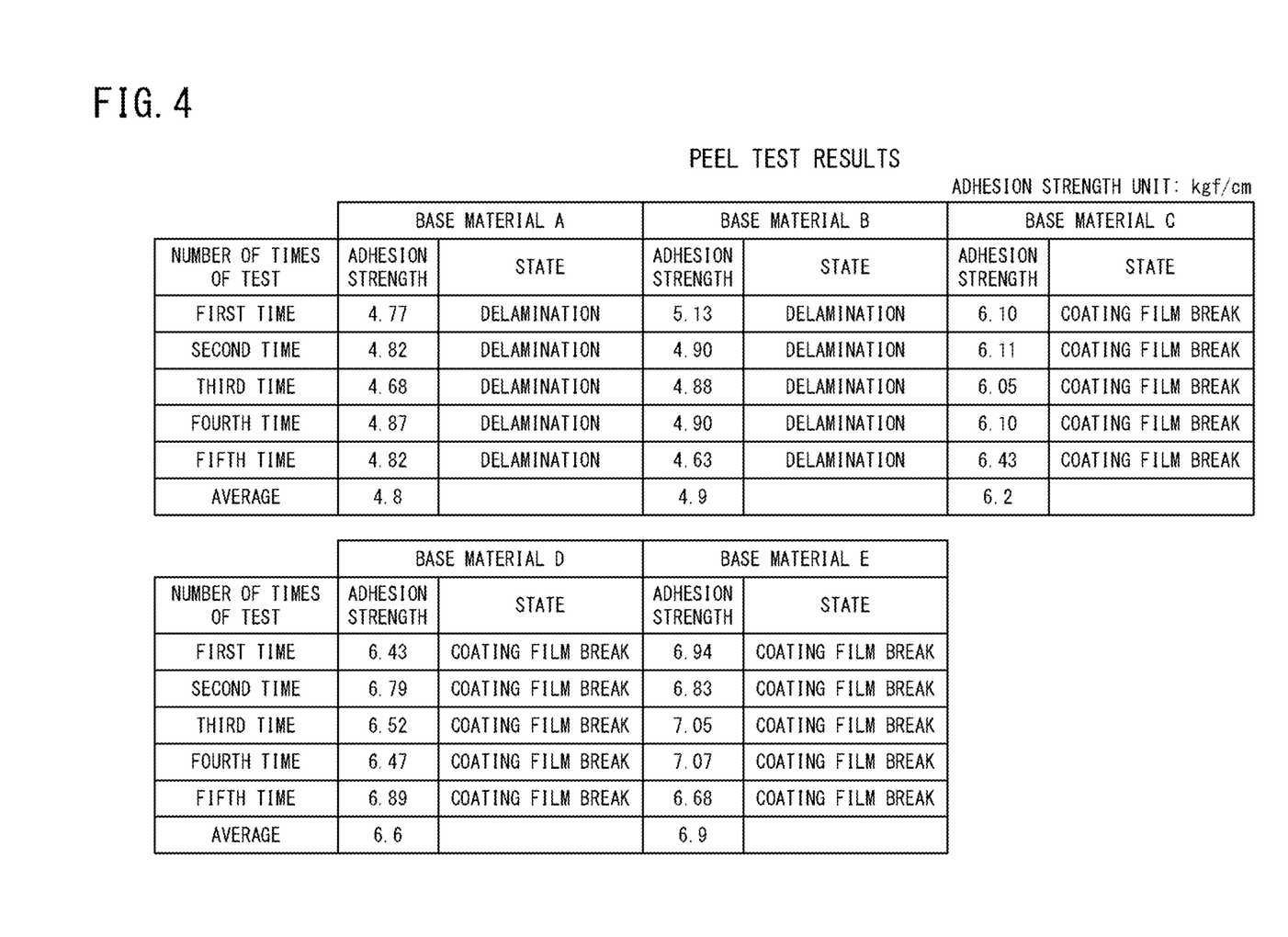
FIG. 4 is a table showing test results of a peel test.

FIG. 4 is a table showing test results of the above peel test. As shown in FIG. 4, in the untreated base material A and the base material B subjected to the blasting, delamination, such as the intermediate layer being peeled off the primer layer and the primer layer being peeled off the surface of the base material, occurred in each coating film. The delamination is a phenomenon that occurs when the adhesion strength of the coating film is less than the coating film strength, and the averages of the adhesion strength between the base materials A and B and the coating films when the delamination occurred were 4.8 kgf/cm and 4.9 kgf/cm, respectively.

On the other hand, in the base materials C to E subjected to the laser machining, coating film break, in which the coating film was broken in the lamination direction, occurred. The coating film break is a phenomenon that occurs when the adhesion strength of the coating film is greater than the coating film strength, and the averages of the adhesion strength between the base materials C to E and the coating films when the coating film break occurred were 6.2 kgf/cm, 6.6 kgf/cm, and 6.9 kgf/cm, respectively.

From the results of the above peel test, it is found that the adhesion strength of the coating films to the base materials C to E subjected to the laser machining of the present embodiment is higher than the adhesion strength to the base material B subjected to the conventional blasting. In addition, since the depth h of each recess of the base materials C, D, and E is set to 0.31H, it is also found that the adhesion strength is increased by setting the depth h such that the depth h is not less than ⅕ of the depth H of the valley portion as described above. Moreover, it is found that the averages of the adhesion strength of the coating films to the base materials C, D, and E are higher in this order as the pitch P of the valley portion is shorter.

In the corrosion resistance test (lining test), five types of samples a, a', b, c, and d described below were compared using a dedicated testing machine for occurrence of blisters in coating films of these samples.

Sample a: a base material whose surface had been subjected to the laser machining of the present embodiment and application of a coating containing a primer of a polymer component and in which the valley portion depth H=300 μm and recess depth h=160 μm (=0.53H).

Sample a': a base material whose surface had been subjected to the laser machining of the present embodiment and application of a coating containing a primer of a polymer component and in which the valley portion depth H=200 μm and recess depth h=100 (=0.50H).

Sample b: a base material whose surface had been subjected to the laser machining of the present embodiment and application of a coating containing a primer of a polymer component and in which the valley portion depth H=150 μm and recess depth h=50 (=0.33H).

Sample c: a base material whose surface had been subjected to the laser machining of the present embodiment and application of a coating containing a primer of a polymer component and in which the valley portion depth H=75 μm and recess depth h=50 μm (=0.67H).

Sample d: a base material whose surface had been subjected to conventional blasting and application of a coating containing a primer of a polymer component.

Figure 5:
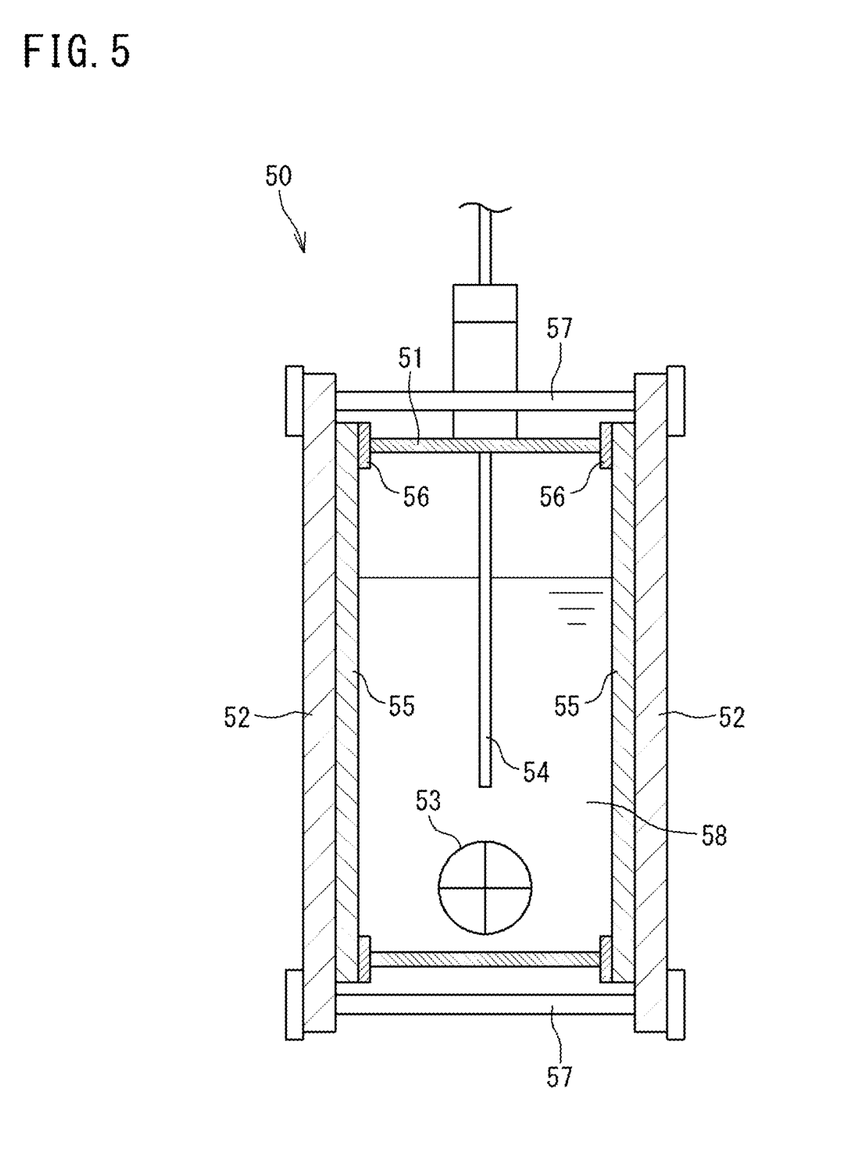
FIG. 5 is a cross-sectional view of a testing machine used for a corrosion resistance test.

FIG. 5 is a cross-sectional view of a testing machine 50 used for the corrosion resistance test. The testing machine 50 includes: a glass tube 51 that is formed in a tubular shape; a pair of outer plates 52 that are disposed at both sides in the axial direction of the glass tube 51 (at both right and left sides in the drawing); a heater 53 that is disposed within the glass tube 51; and an air pipe 54 that communicates with the interior of the glass tube 51. A test piece 55 that is any of the above samples a to d is placed at each of both sides in the axial direction of the glass tube 51 with a gasket 56 interposed therebetween. Each test piece 55 is placed such that the coating film applied to the surface thereof faces the inner side (the glass tube 51 side), and is fixed by a plurality of bolts 57 or the like in a state where the test piece 55 is held between the pair of outer plates 52.

Salt water 58 having a concentration of 10% is enclosed within the glass tube 51, and the temperature of the salt water 58 is maintained at 100° C. by the heater 53. In addition, air is supplied through a lower end portion of the air pipe 54 into the salt water 58. Accordingly, air bubbles are generated in the salt water 58 to promote penetration of the salt water 58 into the coating film of the test piece 55. In this test, the following operations were carried out until the 12th week: each time one week has passed in this state, the test piece 55 is removed from the testing machine 50, the weight of the test piece 55 is measured, and occurrence of blisters in the coating film is observed.

Figure 6:
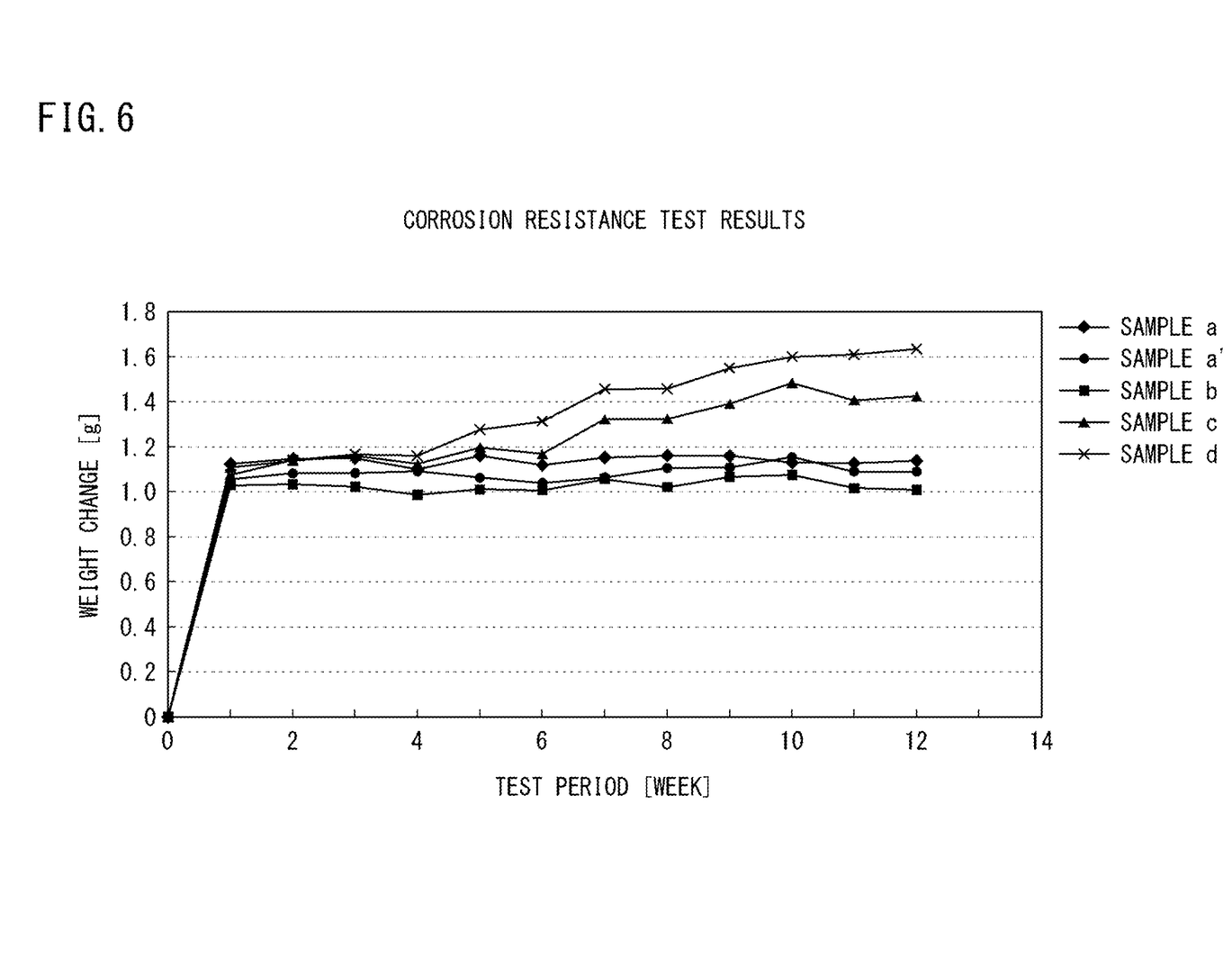
FIG. 6 is a graph showing test results of the corrosion resistance test.

FIG. 6 is a graph showing test results of the above corrosion resistance test. In addition, FIG. 7 to FIG. 10 are drawing-substituting photographs showing states of the coating films of the respective samples a, b, c, and d at the end of the corrosion resistance test. The graph shown in FIG. 6 indicates weight change of the test pieces that are the respective samples a, a', b, c, and d with the passage of the test period.

Figure 9:
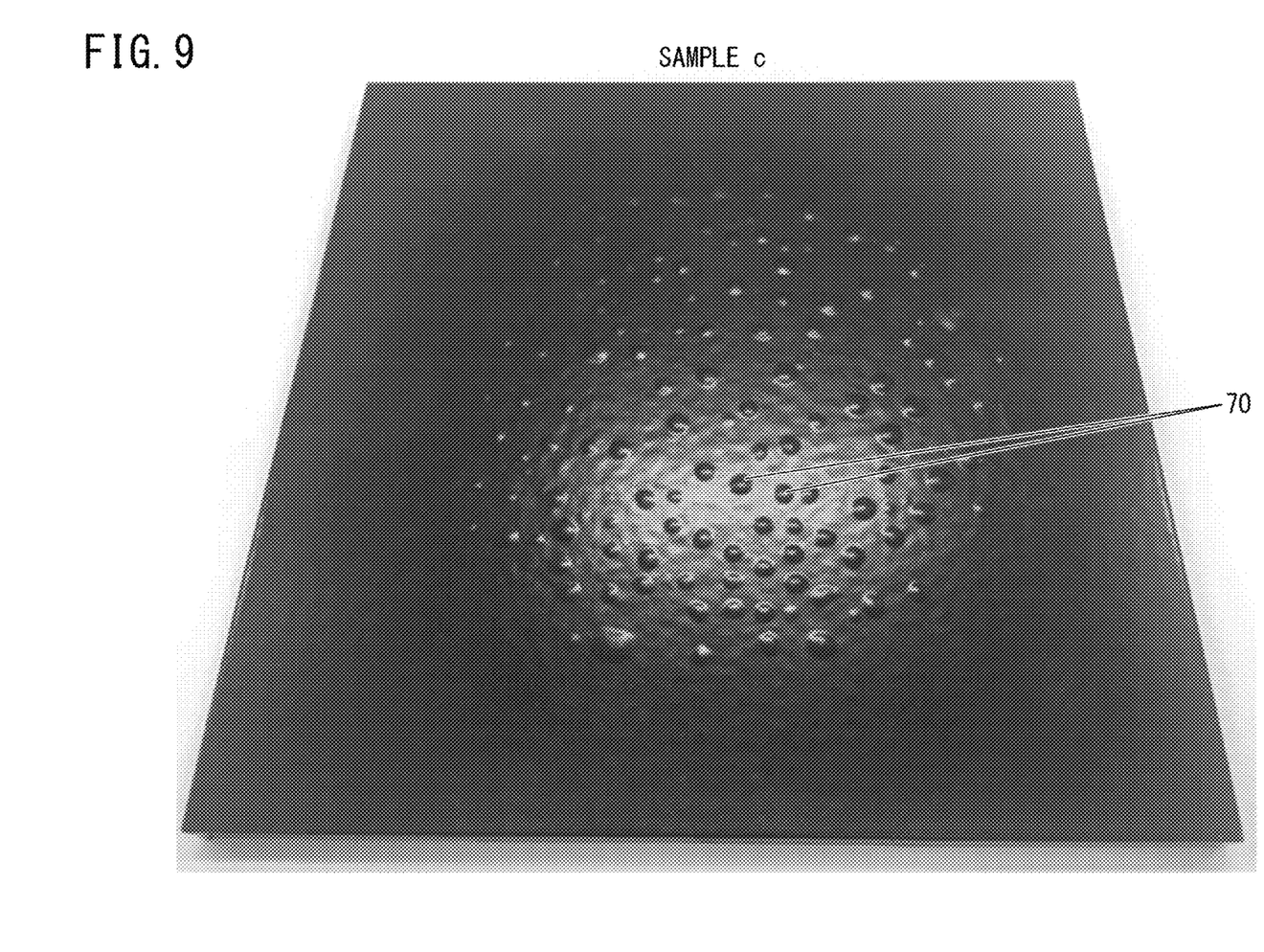
FIG. 9 is a drawing-substituting photograph showing a state of a coating film of a sample c at the end of the corrosion resistance test.
Figure 10:
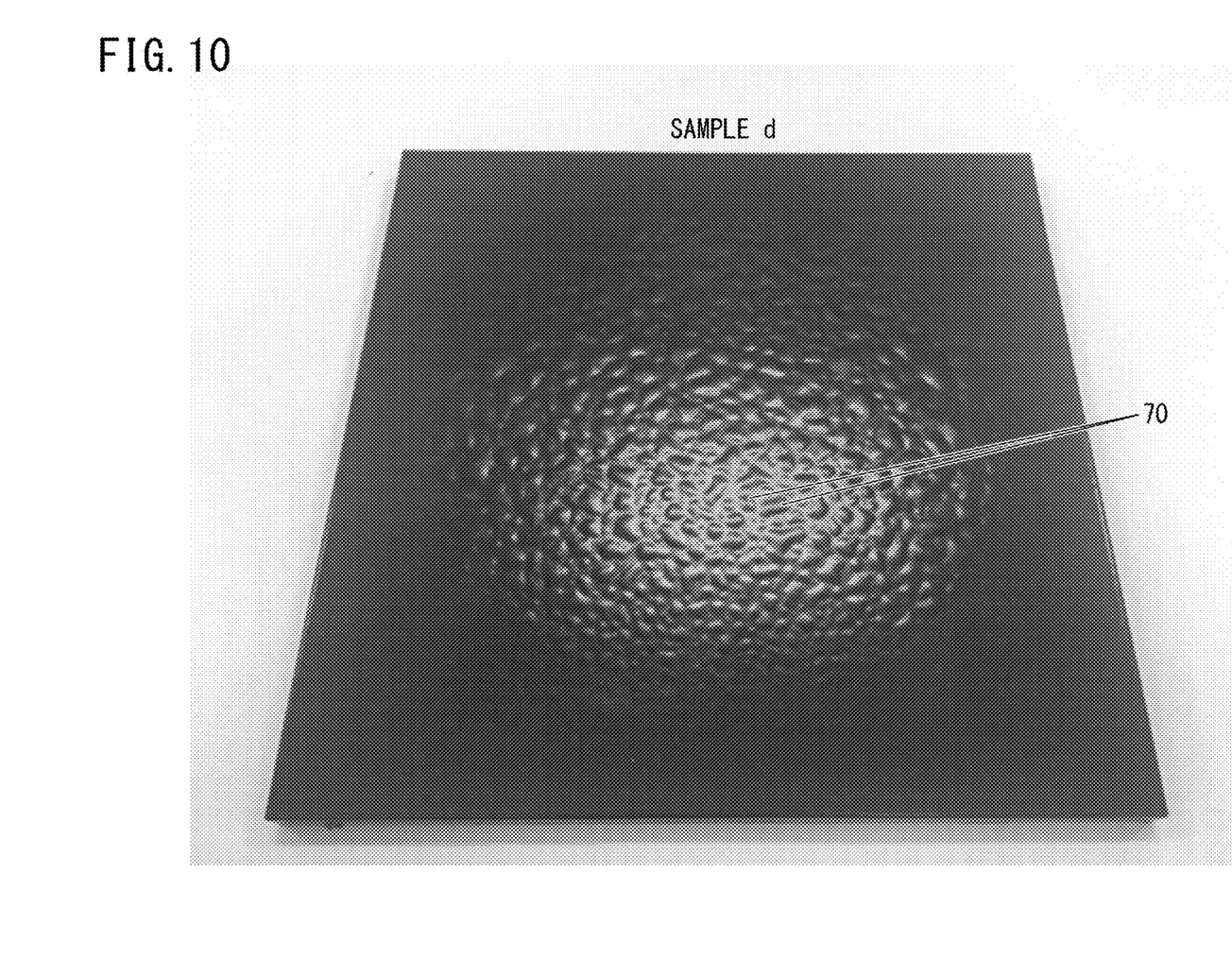
FIG. 10 is a drawing-substituting photograph showing a state of a coating film of a sample d at the end of the corrosion resistance test.

As shown in FIG. 6, the weight of the sample d subjected to the blasting continuously increased from the start of the corrosion resistance test to the end of the corrosion resistance test. It is considered that the reason for this is that blisters 70 (see FIG. 9, etc.) occurred in the coating film and the salt water 58 entered the blisters 70, resulting in the weight increase. As shown in FIG. 10, when the coating film of the sample d was actually observed, a plurality of blisters 70 occurred from the first week. When the coating films of the respective samples a to d in FIG. 7 to FIG. 10 at the end of the test were compared to each other, the number of blisters 70 in the coating film of the sample d in FIG. 10 was the largest, and the size of each blister 70 therein was also large.

Figure 7:
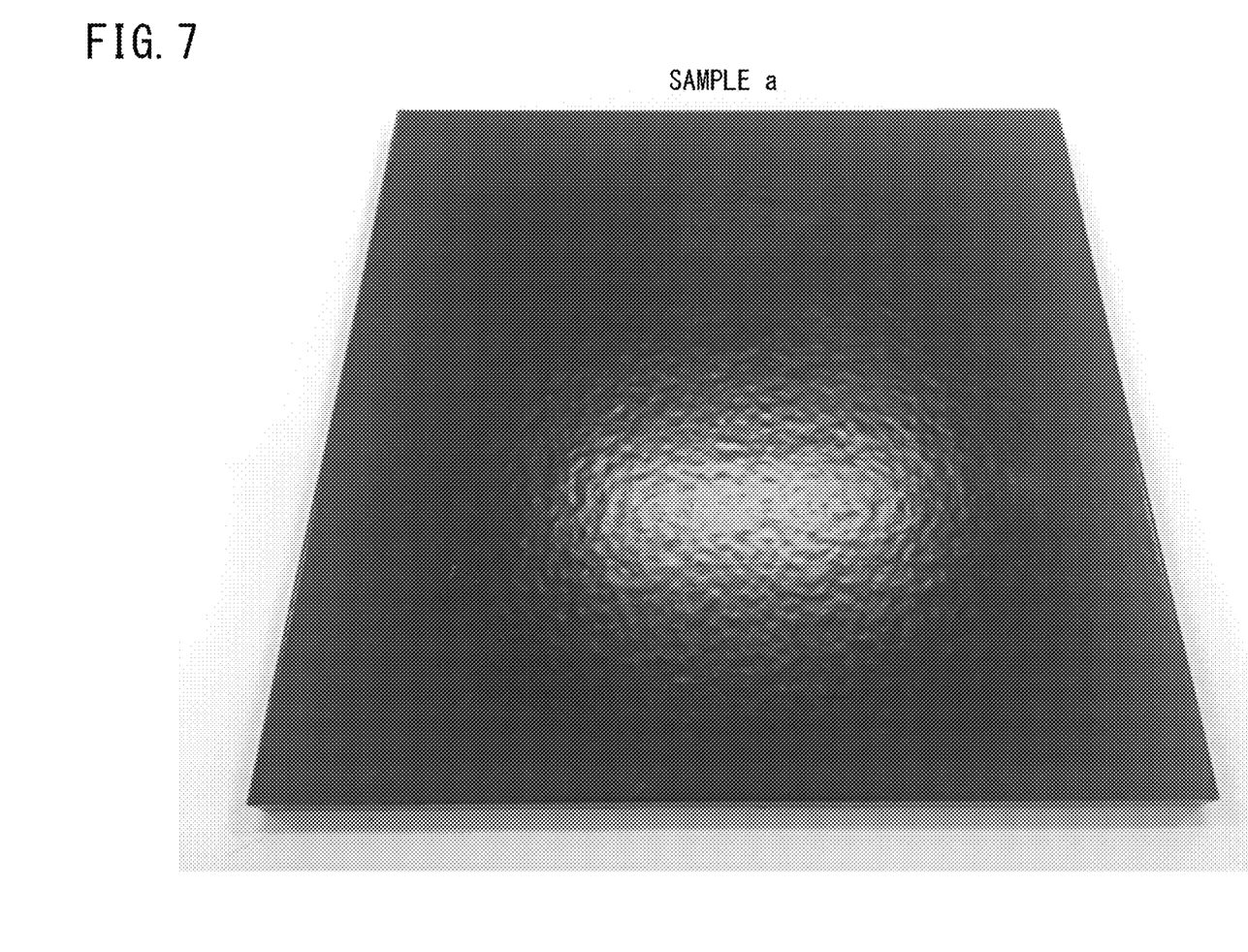
FIG. 7 is a drawing-substituting photograph showing a state of a coating film of a sample a at the end of the corrosion resistance test.
Figure 8:
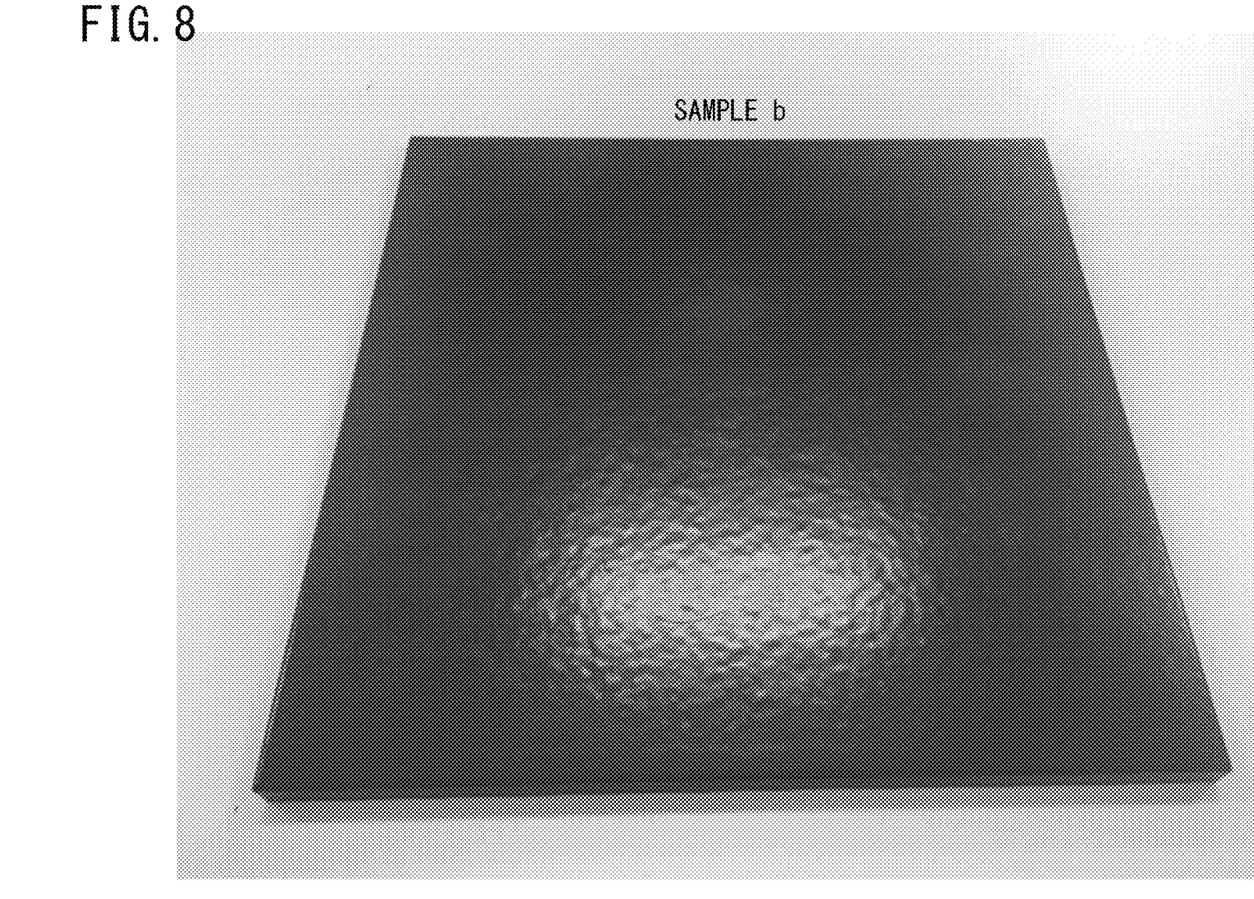
FIG. 8 is a drawing-substituting photograph showing a state of a coating film of a sample b at the end of the corrosion resistance test.

On the other hand, in the samples a, a', and b subjected to the laser machining, continuous weight increase was not observed from the start of the corrosion resistance test to the end of the corrosion resistance test. When the coating films of the samples a and b were actually observed, no blisters 70 occurred in the coating films until the end of the test as shown in FIG. 7 and FIG. 8. Regarding the coating film of the sample a', the state thereof was similar to that of the sample a, and thus the drawing-substituting photograph thereof is omitted.

Moreover, the weight of the sample c subjected to the laser machining continuously increased from the start of the corrosion resistance test to the end of the corrosion resistance test as shown in FIG. 6. Similar to the sample d subjected to the blasting, it is considered that the reason for this is that blisters 70 occurred in the coating film of the sample c and the salt water 58 entered the blisters 70, resulting in the weight increase. However, the weight of the sample c at the end of the test is lighter than the weight of the sample d, and thus it is considered that occurrence of blisters 70 is more inhibited in the sample c than in the sample d since blasting was not performed.

When the coating film of the sample c was actually observed, one blister 70 occurred for the first time at the fifth week, which was later than the time of occurrence of blisters 70 in the sample d (the first week). Furthermore, as shown in FIG. 9 and FIG. 10, when the respective coating films of the samples c and d at the end of the test were compared to each other, the number of blisters 70 that occurred in the coating film of the sample c was smaller, and the size of each blister 70 in the sample c was also smaller.

From the results of the above corrosion resistance test, it is found that the samples a, a', b, and c subjected to the laser machining of the present embodiment can inhibit occurrence of blisters 70 more than the sample d subjected to the conventional blasting. In addition, from the comparison of the samples a, b, and c, it is found that occurrence of blisters 70 can be inhibited more when the depth H of the valley portion is larger. Furthermore, it is found that the samples a and b in which the recess depth h is not less than $\frac{1}{5}$ and not greater than $\frac{3}{5}$ of the valley portion depth H can inhibit occurrence of blisters 70 more than the sample c in which the depth h is not less than $\frac{3}{5}$ of the depth H. Moreover, from the results of FIG. 6 to FIG. 8, it is found that the samples a, a' and b can ensure predetermined adhesion strength.

As described above, in the coating base material 1 of the present embodiment, since the uneven shape composed of the mesh-like valley portion 2 and the plurality of island portions 3 is formed on the surface of the coating base material 1, the adhesion strength between the surface of the coating base material 1 and the coating film 10 can be enhanced similar to an uneven shape formed by conventional blasting or the like. Furthermore, in the present embodiment, since an uneven shape is also formed on the upper surface of each island portion 3 by the crater-like recess 4, when a coating is applied to the surface of the coating base material 1, a coating material located at the inner side (recess 4 side) and the outer side of the bank portion 5, which bulges on the peripheral edge of each recess 4, closely adheres to the bank portion 5 so as to hold the inner side and the outer side of the bank portion 5 by shrinkage stress generated when the coating material cures. Accordingly, the adhesion strength between the surface of the coating base material 1 and the coating film 10 can be further enhanced, and thus the durability of the coating film 10 can be enhanced regardless of the adhesion strength of a primer.

Moreover, when the valley portion 2 and the island portions 3 are formed on the surface of the coating base material 1 by irradiation with a laser beam, the recess 4 can be simultaneously formed by a portion, melted from the surface, bulging on the peripheral edge of the upper surface of each island portion 3. Thus, the coating base material 1 can be efficiently produced.

Furthermore, since the depth h of the recess 4 is set so as to be not less than $\frac{1}{5}$ and not greater than $\frac{3}{5}$ of the depth H of the valley portion 2, the coating material can be appropriately closely adhered to the bank portion 5 on the peripheral edge of the recess 4, and occurrence of blisters 70 in the coating film 10 can be inhibited. Therefore, the durability of the coating film 10 can be further enhanced.

[Others]

Each recess 4 in the above embodiment is formed simultaneously when the valley portion 2 and the island portions 3 are formed by irradiation with a laser beam. However, each recess may be formed by another method, for example, after island portions are formed by irradiation with the laser beam, a recess is formed by irradiating the upper surface of each island portion with a laser beam again to melt the upper surface. In addition, since a coating is applied to the surface of the coating base material of the present invention as described above, the coating base material of the present invention may be in a state prior to coating or in a state after coating.

Moreover, in the above embodiment, each island portion 3 is formed in a square shape in a front view, but the shape of each island portion 3 is not limited to this shape. For example, each island portion 3 may be formed in another shape, such as a triangular shape, a pentagonal shape, a hexagonal shape, or a circular shape, in a front view, or may be formed as a combination of island portions 3 having two or more types of shapes (for example, a pentagonal shape and a hexagonal shape) in a front view. In addition, the valley portion 2 is formed in a mesh shape with repeated regular intervals, but may be formed in a mesh shape with random intervals.

The embodiments disclosed herein are merely illustrative and not restrictive in all aspects. The scope of the present disclosure is defined by the scope of the claims rather than the meaning described above, and is intended to include meaning equivalent to the scope of the claims and all modifications within the scope.

REFERENCE SIGNS LIST 1 coating base material
2 valley portion 3 island portion
4 recess
10 coating film
H depth of valley portion
h depth of recess

The invention claimed is:

1. A coating base material whose surface is subjected to application of a coating, the coating base material comprising:
 a mesh valley portion formed on the surface; and
 a plurality of island portions formed on the surface and surrounded by the valley portion, wherein
 each island portion has a crater recess formed on an upper surface thereof,
 the valley portion and the plurality of island portions are formed by irradiation of the surface with a laser beam, and
 the recess is formed by a bank portion, melted from the surface by the irradiation with the laser beam, bulging on a peripheral edge of the upper surface.

2. The coating base material according to claim 1, wherein the recess has a depth not less than ⅕ of a depth of the valley portion.

3. The coating base material according to claim 1, wherein the recess has a depth not less than ⅕ and not greater than ⅗ of a depth of the valley portion.

4. The coating base material according to claim 1, wherein the bank portion is formed on an entire peripheral edge of the recess by the portion melted from the surface.

5. The coating base material according to claim 1, wherein the bank portion has an outer shape formed substantially in a square shape.

* * * * *